United States Patent
Glashagen et al.

(10) Patent No.: US 7,455,516 B2
(45) Date of Patent: Nov. 25, 2008

(54) HORIZONTAL INJECTION MOLDING MACHINE WITH A MOVABLE TURNTABLE FOR MOLDS OF INJECTION MOLDING TOOLS

(75) Inventors: Bernd Glashagen, München (DE); Reinhard Holzinger, München (DE)

(73) Assignee: Krauss Maffei GmbH, München (DE)

(*) Notice: Subject to any disclaimer, the term of this patent is extended or adjusted under 35 U.S.C. 154(b) by 0 days.

(21) Appl. No.: 11/869,084

(22) Filed: Oct. 9, 2007

(65) Prior Publication Data

US 2008/0026097 A1    Jan. 31, 2008

Related U.S. Application Data

(63) Continuation of application No. PCT/EP2006/060836, filed on Mar. 17, 2006, and a continuation of application No. PCT/EP2006/060838, filed on Mar. 17, 2006.

(30) Foreign Application Priority Data

Apr. 8, 2005  (DE) .................. 10 2005 016 239
Apr. 8, 2005  (DE) .................. 10 2005 016 240

(51) Int. Cl.
    *B29C 45/66*    (2006.01)
(52) U.S. Cl. .................. 425/572; 425/574; 425/576
(58) Field of Classification Search .................. 425/572, 425/574, 576, 588
    See application file for complete search history.

(56) References Cited

U.S. PATENT DOCUMENTS

| 5,773,049 | A  |   | 6/1998  | Kashiwa |
| 6,139,305 | A  | * | 10/2000 | Nesch ..................... 425/130 |
| 6,709,251 | B2 | * | 3/2004  | Payette et al. ............ 425/576 |
| 6,783,346 | B2 |   | 8/2004  | Bodmer et al. |
| 7,186,113 | B2 | * | 3/2007  | Lichtinger ................ 425/576 |
| 7,314,362 | B2 | * | 1/2008  | Lichtinger ................ 425/576 |

FOREIGN PATENT DOCUMENTS

| DE | 30677       | 4/1965 |
| DE | 19733667 A1 | 2/1999 |
| DE | 10227636 A1 | 1/2004 |
| EP | 1226916 A1  | 7/2002 |
| EP | 1512512 A2  | 3/2005 |

(Continued)

OTHER PUBLICATIONS

Dassow: Für alle Fälle gerüstet. Technologieführerschaft durch Mehrkomponententechnik, in:Ku Kunststoffe, Hanser Verlag, 2002.

*Primary Examiner*—Tim Heitbrink
(74) *Attorney, Agent, or Firm*—Henry M. Feireisen; Ursula B. Day (57) ABSTRACT

A horizontal injection molding machine includes two platens, of which one can be a fixed or a moving platen and the other a moving platen, with the platens moving on horizontal columns, and a mold half carrier which is rotatably supported by a turntable and carries mold halves for injection molding tools. A yoke extends between the upper columns for movement along the upper columns. The mold half carrier has on its top side a pivot pin which engages in an opening of the yoke. This arrangement eliminates or at least reduces forces on the columns due to weight and torques.

23 Claims, 5 Drawing Sheets

FOREIGN PATENT DOCUMENTS

| | | |
|---|---|---|
| JP | 62060618 A | 3/1987 |
| JP | 05346356 | 12/1993 |
| JP | 06254906 | 9/1994 |
| WO | WO99/28108 | 6/1999 |
| WO | WO01/10624 | 2/2001 |
| WO | WO03/0138024 | 2/2003 |
| WO | WO2005/007381 A2 | 1/2005 |
| WO | WO2005/077637 A1 | 8/2005 |

* cited by examiner

HORIZONTAL INJECTION MOLDING MACHINE WITH A MOVABLE TURNTABLE FOR MOLDS OF INJECTION MOLDING TOOLS

CROSS-REFERENCES TO RELATED APPLICATIONS

This application is a continuation of prior filed copending PCT International Application No. PCT/EP2006/060836, filed Mar. 17, 2006, which designated the United States and has been published but not in English as International Publication No. WO 2006/106035 and on which priority is claimed under 35 U.S.C. §120, and which claims the priority of German Patent Application, Serial No. 10 2005 016 240.1, filed Apr. 8, 2005.

This application is also a continuation of prior filed copending PCT International Application No. PCT/EP2006/060838, filed Mar. 17, 2006, which designated the United States and has been published but not in English as International Publication No. WO 2006/106036 and on which priority is claimed under 35 U.S.C. §120, and which claims the priority of German Patent Application, Serial No. 10 2005 016 239.8, filed Apr. 8, 2005, pursuant to 35 U.S.C. 119(a)-(d).

The contents of International Application Nos. PCT/EP2006/060836 and PCT/EP2006/060838 as well as German Patent Application, Serial Nos. 10 2005 016 240.1 and 10 2005 016 239.8 are incorporated herein by reference in their entirety as if fully set forth herein.

BACKGROUND OF THE INVENTION

The present invention is directed, in general, to an injection molding machine with a moving rotary device.

WO 01/010624 discloses a two-platen horizontal injection molding machine with a fixed platen and a moving platen, which moves along columns, as well as a rotary device which is provided for injection molding tools and arranged between the two platens, and which is displaceable parallel to the longitudinal machine axis and rotatable about a vertical axis. The rotary device includes a base plate which can be moved by a drive assembly in the longitudinal machine direction, a turntable which is arranged on the base plate and which can be rotated by second drive means about the vertical axis. For displacing the base plate, hydraulic actuators are provided which are attached, on one hand, on the base plate and, on the other hand, in the machine bed and/or on the fixed platen. This type of horizontal injection molding machine is applicable for smaller sized machines. However, when large-sized horizontal injection molding machines are involved which have correspondingly sized rotary device and heavy mold halves, tilting moments are encountered during acceleration and deceleration of the base plate due to their mass inertia which have to be compensated. The base plate is thus guided on linear guides which must be correspondingly dimensioned in cross-section, for example a dovetail cross-section. With increasing size of the horizontal injection molding machine, the tilting moments to be absorbed also increase; however, the required linear guides with a dovetail cross-section are relatively expensive and not available for very large horizontal injection molding machines.

WO 03/013824 A1 discloses a two-platen horizontal injection molding machine wherein a reversing plate adapted to receive mold halves of injection molding tools and operating as rotary device for the injection molding tools is stationarily supported for rotation about a vertical axis in two directions in a closed solid support frame or in a C-shaped support frame which is open to one side, with the platens being movable relative to the support frame.

The document JP 62060618A discloses a two-platen horizontal injection molding machine with a rotary device which is provided for injection molding tools and arranged between the two platens and which is displaceable parallel to the longitudinal machine axis and rotatable about a vertical axis. In this horizontal injection molding machine, the rotary device has upper and lower support blocks which are supported and guided on the columns. A mold half carrier with an upper and a lower pivot pin arranged on an axis is received for rotation between the support blocks. For moving the mold half carrier along the longitudinal machine axis, hydraulic actuators are provided between the fixed platen, on one hand, and, the upper and lower support blocks, on the other hand. In this horizontal injection molding machine, the columns are subjected to weight torque and torsion torque, in particular when using heavy mold half carriers. Because the moving platen is displaced via the columns, loading of the columns with weight and torsion torques has also an adverse affect on the movement mechanism and the travel for the moving platen.

DE 19733667 A1 discloses a three-platen horizontal injection molding machine with a moving platen which extends between a fixed platen and a support platen and which is longitudinally displaceable in the fixed upper and lower columns. A rotary device provided for mold halves of injection molding tools and displaceable parallel to the longitudinal machine axis, is provided between the platens. In this horizontal injection molding machine, the rotary device has upper and lower support blocks which are supported and guided on the columns. A mold half carrier is rotatably received between the support blocks by an upper and lower pivot pin arranged on an axis and in suitable bearings. For moving the mold half carrier along the longitudinal machine axis, hydraulic actuators are provided between the moving platen and the upper and lower support blocks. In this type of three-platen horizontal injection molding machine, the lower columns are under stress because they have to support the substantial weight of the mold half carriers. When heavy mold half carriers are involved, there is a need to prop up the lower support block with rollers and/or skids on the machine bed.

WO 99/28108 discloses a three-platen injection molding machine having two pivot pins provided with several channels or passageways for conducting media, such as gases, liquids or electric current, to the mold half carriers and onward to the mold halves.

It would be desirable and advantageous to provide an improved horizontal injection molding machine which obviates prior art shortcomings and yet is simple in structure and reliable in operation.

SUMMARY OF THE INVENTION

According to one aspect of the invention, a horizontal injection molding machine includes two moving platens constructed for relative movement therebetween, a base plate disposed between the two moving platens and constructed for movement in parallel relationship to a longitudinal machine axis, a turntable supported on or in the base plate for rotation about a vertical axis, a mold half carrier attached to the turntable for carrying mold halves of injection molding tools, with the mold half carrier having a topside provided with a pivot pin, a plurality of upper and lower columns extending between the fixed and moving platens, and a yoke extending between the upper columns and movable relative to the upper columns, wherein the yoke has an opening for rotatably accepting the pivot pin of the mold half carrier.

According to another aspect of the invention, a horizontal injection molding machine includes a fixed platen, a moving platen constructed for movement in relation to the fixed platen, a base plate disposed between the fixed and moving platens and constructed for movement in parallel relationship to a longitudinal machine axis by a first drive assembly, a turntable supported on the base plate for rotation about a vertical axis, a mold half carrier attached to the turntable for carrying mold halves of injection molding tools, with the mold half carrier having a topside provided with a pivot pin, a plurality of upper and lower columns extending between the fixed and moving platens, a yoke extending between the upper columns and movable relative to the upper columns, with the yoke having an opening for rotatably accepting the pivot pin of the mold half carrier, and a second drive assembly arranged between the yoke and one of the fixed and moving platens, with the second drive assembly having a first drive positioned on one side of the pivot pin and a second drive positioned on another side of the pivot pin for moving the yoke relative to the one of the fixed and moving platens.

The present invention resolves prior art problems by providing a moving yoke between the upper columns, which is moving along the columns and engageable by a pivot pin of the center mold half carrier. The center mold carrier can be moved by a first drive assembly which engages the base plate from below as well as by the second drive assembly that operates on the yoke, so that the presence of tilting moments during acceleration and deceleration of the rotary device can be eliminated. The entire weight of the rotary device is thereby kept away from the columns. The lower columns are neither subject to weight moments nor torque. The upper columns need, at the most, to support the weight of the yoke only; the weight can also be kept away from the upper columns by supporting the weight of the yoke on the mold carrier element by suitable sliding or roller bearings. Any torque resulting from the friction between the pivot pin and the yoke can be neglected, in particular when using appropriate bearings. Weight and torsion torques can then be kept away from all four columns so that complex linear guides can be used even when a large horizontal injection molding machine is involved.

According to another feature of the present invention, the first and second drives may be constructed as hydraulic actuators arranged to the left and right, respectively, of the pivot pin.

According to another feature of the present invention, the yoke may be supported upon the mold half carrier through intervention of a bearing unit, e.g. a slide bearing or a roller bearing.

According to another feature of the present invention, the pivot pin is supported on the topside of the mold half carrier for rotation therewith and may constitute an inner part of a rotary distributor configured to supply media to at least one of the mold half carrier and mold halves, with the rotary distributor having a non-rotating outer part which is connected to the yoke.

According to another feature of the present invention, first linear guides can be mounted on the machine bed for guiding the movement of the moving platen, and second linear guides can be provided on or in the machine bed for guiding the movement of the base plate.

According to another feature of the present invention, the first drive assembly is disposed between the base plate and the fixed platen. Suitably, first drive assembly includes a hydraulic actuator.

According to another feature of the present invention, a trailing cable installation may be secured on the yoke for flexibly carrying along supply lines.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
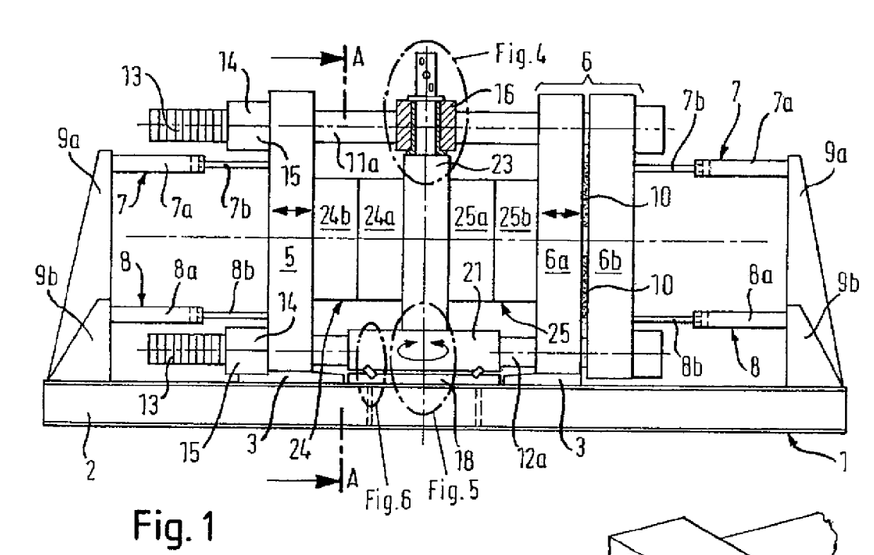
FIG. 1 shows schematically a side view of a first embodiment of a two-platen horizontal injection molding machine according to the invention.
Figure 2:
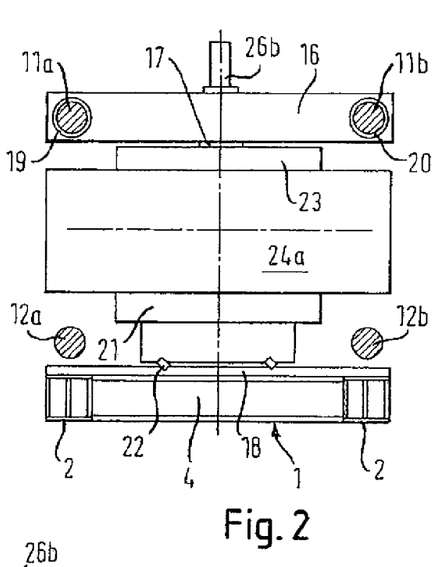
FIG. 2 shows schematically a front view of the two-platen horizontal injection molding machine of FIG. 1 taken along the line A-A.
Figure 3:
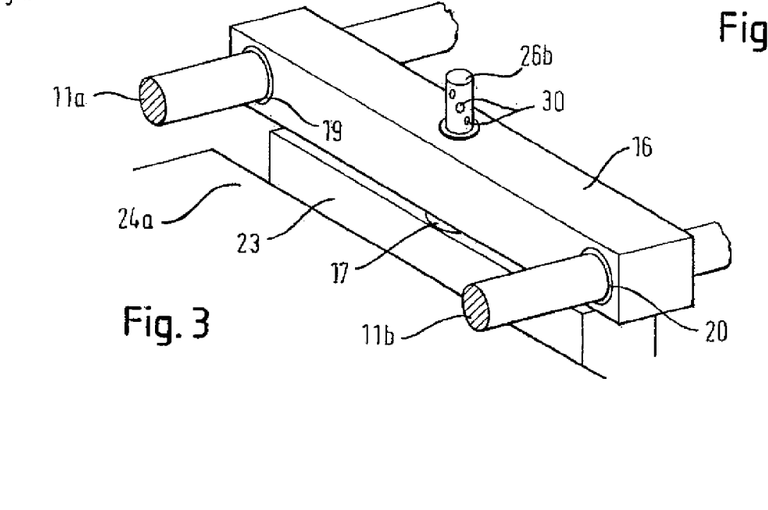
FIG. 3 shows a perspective top view with a detail of the yoke with an upper rotary distributor and a rotary feedthrough of the two-platen horizontal injection molding machine of FIG. 1.

Turning now to the drawing, and in particular to FIG. 1, there is shown a first embodiment of a two-platen horizontal injection molding machine according to the invention with a fixed, centrally located rotary device. Two platens 5 and 6 are movably supported on massive slide shoes 3 on a machine bed 1 by way of two longitudinal support beams 2 and transverse struts 4. The two platens 5 and 6 can be moved by diagonally opposed hydraulic actuators 7 (top) and 8 (bottom). The actuators are mounted, on one hand, (for example with the cylinders 7a, 8a) on support struts 9a and 9b connected to the machine bed and, on the other hand, (for example with piston rods 7b, 8b) to the platens. The platen 6 is composed of the actual platen 6a and a pressure plate 6b, between which four pressure cushions are arranged for producing the clamping pressure, with only the rear pressure cushions 9 and 10 being visible in the Figure. Two columns 11a,b and 12a,b, in parallel relationship and in a plane, are secured between the two platens 5 at the top and at the bottom, with only the rear columns 11a and 12a visible in the Figure. The columns extend through the left platen 5 in FIG. 1 and have grooves 13 on their protruding end for engagement of hemispherical locking jaws 14 and 15. In the position illustrated in FIG. 1, the locking jaws are closed and the clamping unit is locked. A turntable 21 is rotatably supported for rotation about a vertical axis on a base plate 18 attached on or in the machine bed 1 by way of a suitable bearing, in the present example a cross roller bearing 22. A mold half carrier 23, which in the present example is configured as a reversing plate, is affixed to the turntable 21 and carries mold halves 24a and 25a of two injection molds 24 and 25. The corresponding mold halves 24b and 25b are disposed on the platens 5 and 6a.

Figure 4:
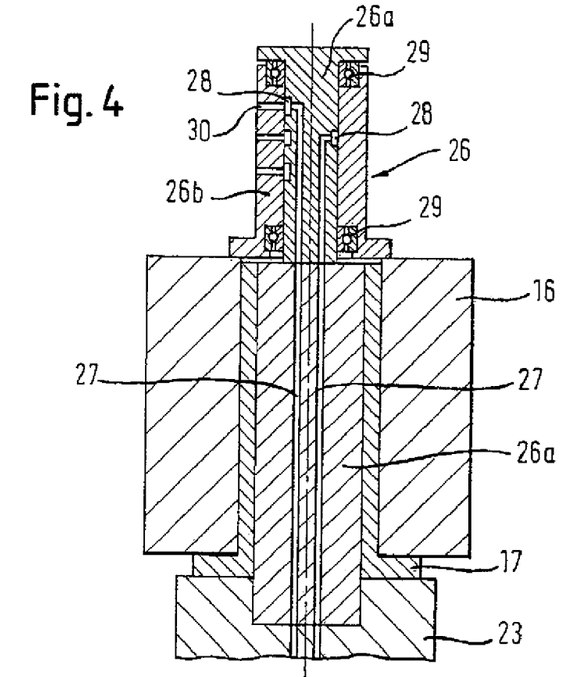
FIG. 4 shows in cross-section a detail of the upper rotary distributor of FIG. 3.

A yoke 16 is supported above the reversing plate 23 by way of a first slide bushing 17 disposed on the top side of the reversing plate 23 for rotation relative to the reversing plate 23. The columns 11a and 11b extend through the yoke 16 through additional slide bushings 19 and 20 in matching bores. The first slide bushing 17 extends through a matching opening in the center of the yoke 16 and is used for passing a rotary distributor or a rotary feedthrough 26 for supply of media, such as water, auto, air, electric current and the like, to the reversing plate 23 and the mold halves 24a, 25a (for a detailed description of the upper rotary distributor 26, see FIG. 4). The inner part 26a is fixedly connected to the reversing plate 23 and includes channels 27 which terminate above the yoke 16 in annular grooves 28 and which can be used to supply the desired media to and discharge the media from the mold halves. The outer part 26b is secured on the yoke 16 and supported for rotation relative to the inner part 26a by way of upper and lower bearings 29. Connecting channels 30 are provided in the outer part 26b which terminate in the annular grooves 28 of the inner part 26a and which can be connected to the lines for the respective media.

Figure 5:
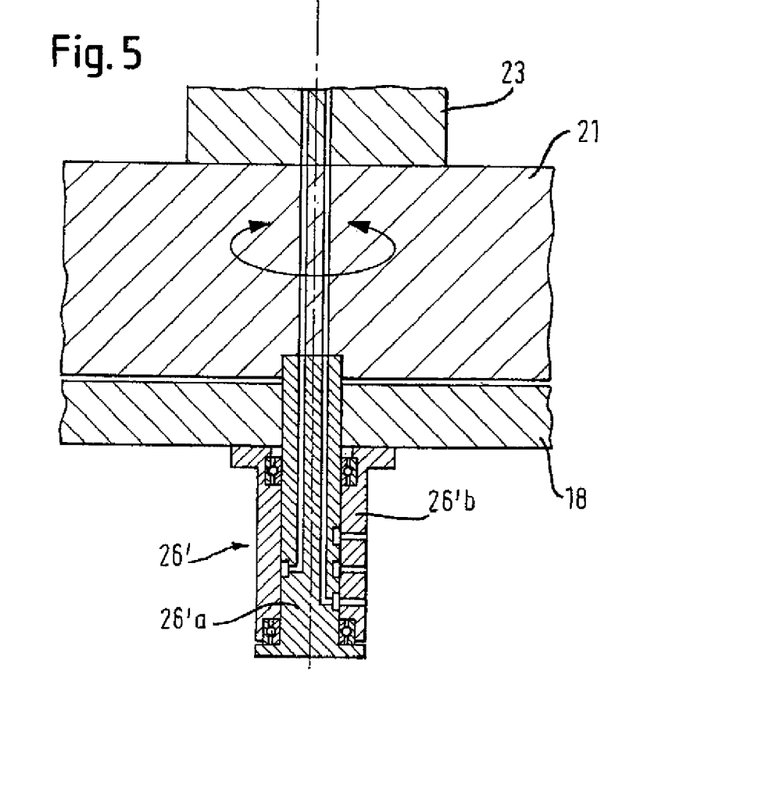
FIG. 5 shows a detail of a lower rotary distributor in cross-section.

Another rotary distributor 26' which is illustrated in more detail in FIG. 5 is provided below the reversing plate 23. This rotary distributor is of the same type as the upper rotary distributor 26 arranged above the reversing plate 23. The inner part 26'a is fixedly connected to the turntable 21 or the reversing plate 23, whereas the outer part 26'b is fixedly connected to the base plate 18 and supported by several bearings for rotation relative to the inner part.

Figure 6:
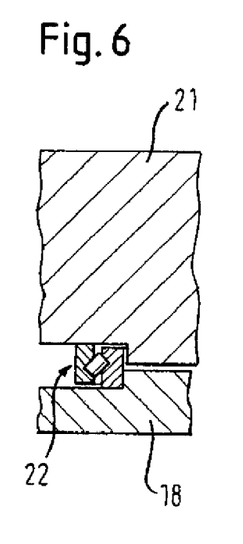
FIG. 6 is an enlarged view of a cross roller bearing supporting the turntable on the baseplate.

FIG. 6 illustrates on an enlarged scale the support of the turntable 21 on the base plate 18 by a cross roller bearing 22. Other suitable bearings can be used in lieu of the cross roller bearing. The rotary drive may be conventional and is therefore not illustrated or described in detail. For example, a gear ring can be provided on the outer circumference of the turntable, in which a gear wheel driven by an electric motor or a hydraulic motor engages.

Figure 7:
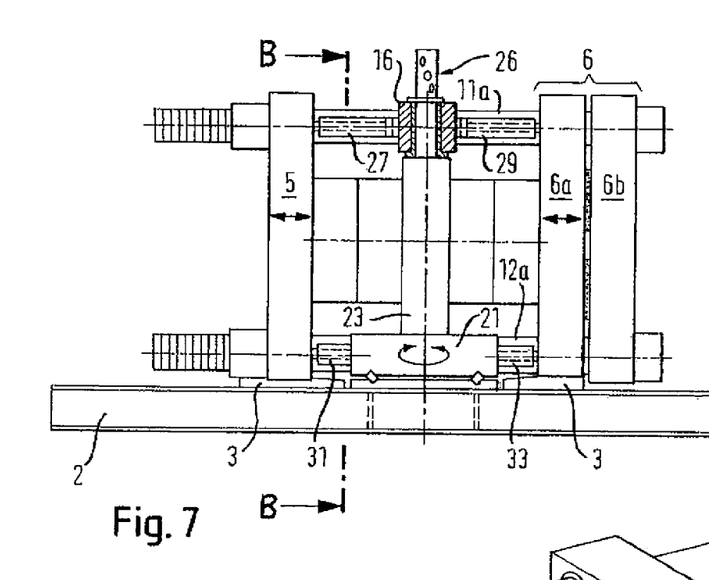
FIG. 7 shows schematically a side view of a second embodiment of a two-platen horizontal injection molding machine according to the invention.
Figure 8:
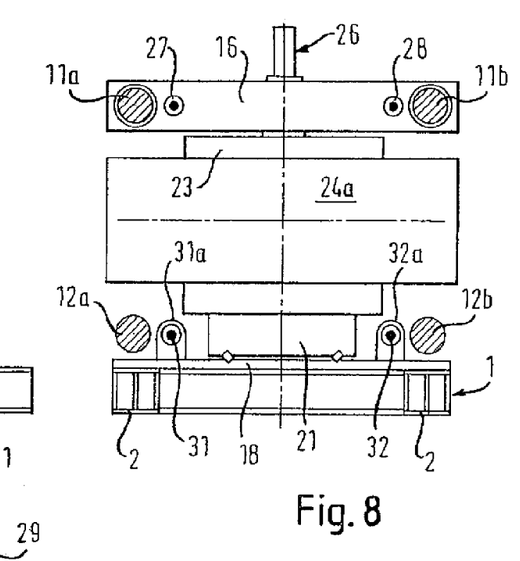
FIG. 8 shows schematically a front view of the two-platen horizontal injection molding machine of FIG. 7 taken along the line B-B.
Figure 9:
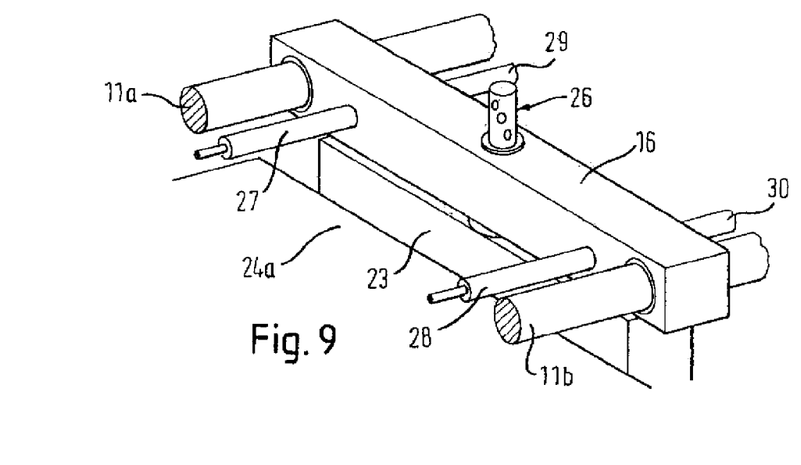
FIG. 9 shows a perspective top view with a detail of the yoke with an upper rotary distributor and a rotary feedthrough of the two-platen horizontal injection molding machine of FIG. 7.

FIGS. 7 to 9 show a second embodiment of a two-platen horizontal injection molding machine according to the invention with a stationary rotary device. Identical components are designated with identical reference symbols. Unlike the first embodiment depicted in FIGS. 1 to 6, the hydraulic actuators of the first embodiment located outside the region of the platen are replaced with hydraulic actuators located between the rotary device and the platens. As seen in FIGS. 7 to 9, a total of four hydraulic actuators 27, 28, 29 and 30 are arranged between the joke 16 and the two platens 5 and 6 on both sides of the yoke at a distance from the upper rotary distributor 26. The actuators 27 and 28 are mounted between the yoke 16 and the left platen 5, as viewed in FIG. 7, whereas the actuators 29 and 30 are mounted between the yoke 16 and the right platen 6, as viewed in FIG. 7. The actuators 27 and 29 are aligned on an axis, as are the actuators 28 and 30. In this way, the forces transferred to the yoke 16 compensate each other and the yoke 16 is not tilted relative to the columns 11a and 11b. Likewise, four hydraulic actuators 31, 32, 33 and 34 are arranged below the reversing plate 23, which are attached, on one hand, to brackets 31a to 34a which are connected to the base plate 18 and, on the other hand, to the platens. The actuators 31 and 33 and the actuators 32 and 34, respectively, are each aligned on a respective axis. Due to the particular view, neither the brackets 33a and 34a nor the hydraulic actuators 34 are visible in the Figure (which would be located in the lower right corner of FIG. 1 in front of the actuator 33).

Figures 10, 11, 12:
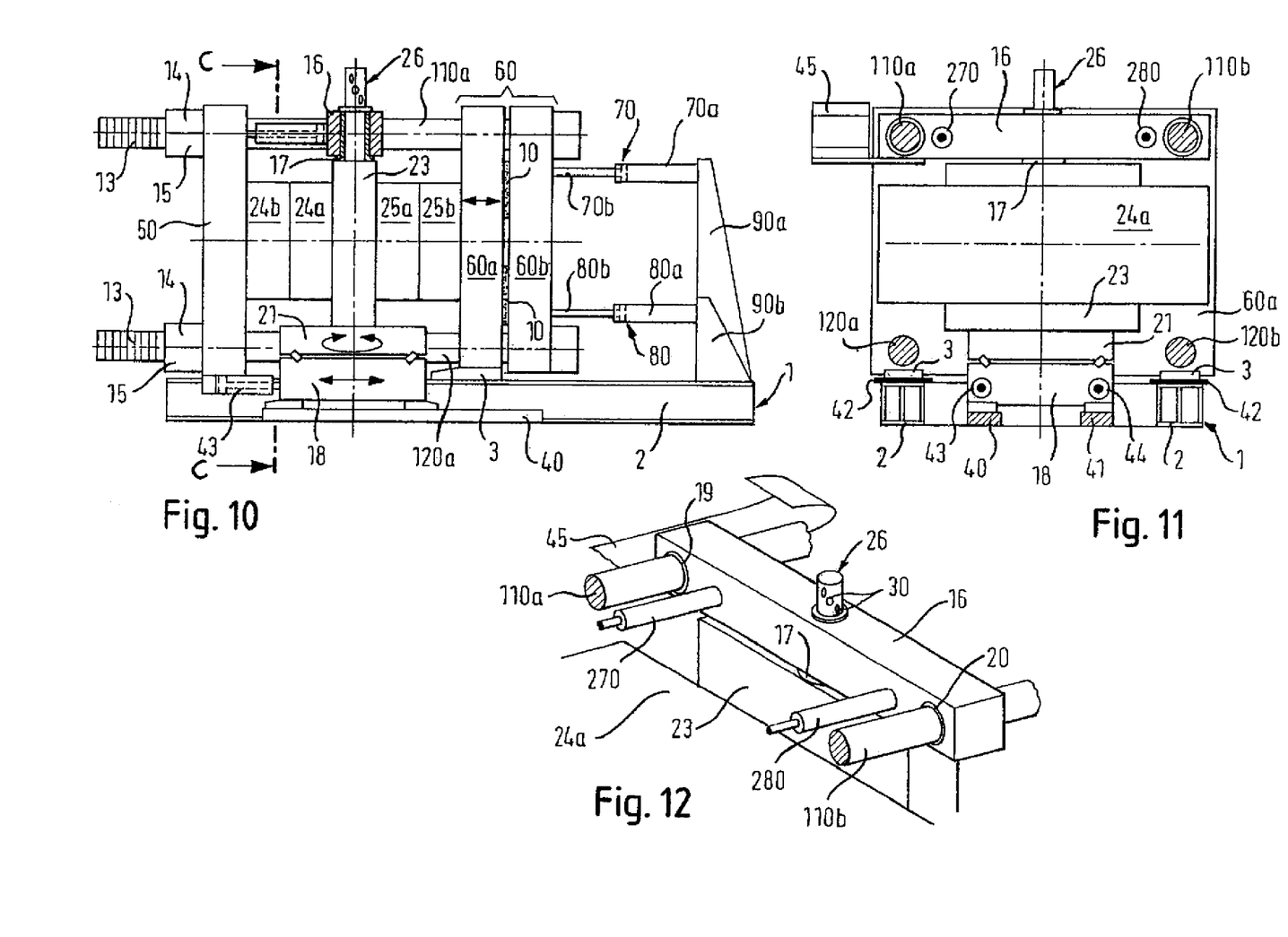
FIG. 10 shows schematically a side view of a two-platen horizontal injection molding machine of the invention.
FIG. 11 shows schematically a front view of the two-platen horizontal injection molding machine of FIG. 1 taken along the line C-C.
FIG. 12 shows a perspective top view with a detail of the yoke with a rotary distributor and a rotary feedthrough of the two-platen horizontal injection molding machine of FIG. 10.

FIGS. 10 to 12 illustrate a third embodiment of a horizontal injection molding machine according to the invention. Unlike the first and second embodiments, one of the platens, in the present example the left platen 50, is here fixedly secured on a machine bed 1, and a moving platen 60 which is movably supported on massive slide shoes 60 and matching linear guides 42. The moving platen 60 can be moved by hydraulic actuators 70 and 80 which are arranged diagonally with respect to one another. These are secured, on one hand, (for example, with the cylinders 70a, 80a) on support struts 90a and 90b, which are connected to the machine bed, and, on the other hand, on the moving platen 60 (for example with their piston rods 70b, 80b). The hydraulic actuators 70 and 80 can also be arranged between the fixed and the moving platens. The platen 60 is composed of the actual platen 60a and a pressure plate 60b, between which four pressure cushions 10 are arranged for producing the clamping pressure, with only the rear pressure cushions 9 and 10 visible in FIG. 10. Secured to the moving platen 60 at the top and the bottom are two columns 110a,b and 120a,b, respectively, in parallel relationship and in a plane, of which only the rear columns 110a and 120a are visible in FIG. 10. The columns extend through the fixed platen 50 and have grooves 13 on their protruding end, for engagement of locking jaws 14 and 15. A base plate 18 can be moved on additional linear guides 40 and 41 by means of hydraulic actuators 43 and 44 in parallel relationship to the longitudinal machine axis. A turntable 21 is supported on the base plate 18 by a cross roller bearing 22 (see FIG. 6) for rotation about a vertical axis. The construction of the rotary device itself is otherwise identical to the embodiments illustrated in FIGS. 1 to 9.

A yoke 16 is positioned above the reversing plate 23 and supported by a first slide bushing 17 disposed on the top side of the reversing plate 23 for rotation with respect thereto. The columns 110a and 110b are guided through the yoke 16 via additional slide bushings 19 and 20 in mating bores. The first slide bushing 17 extends through a mating opening in the center of the yoke 160. A rotary distributor or a rotary feedthrough 26 passes through the slide bushing 17 and supplies media, such as water, oil, air, electric power and the like to the reversing plate 23 and the mold halves 24a, 25a. The supply lines for the media (not shown) leading to the connections 30 in the rotary distributor can be implemented as a trailing cable installation 45 secured to the yoke 16 which can then flexibly follow the travel of the turntable.

Two hydraulic actuators 270 and 280 are arranged between the yoke 16 and the fixed platen 50 at a distance to the rotary distributor 26. The entire turntable can be moved by the actuators 43 and 44 which operate below the reversing plate 23 on the base plate 18 without the risk of generating a tilting moment during acceleration and deceleration along the longitudinal machine axis. The linear guides 40 and 41 therefore do not need to be provided with a special cross-section, for example a dovetail cross-section, for absorbing the tilting moment. Instead, simple linear guides suffice as long as they provide lateral guiding, such as a U-shaped rail, in which a mating guide section disposed on the bottom side of the base plate can engage, or a rail with an inverted T-profile (see FIG. 11), which engages with a mating groove on the bottom side of the base plate.

Figure 13:
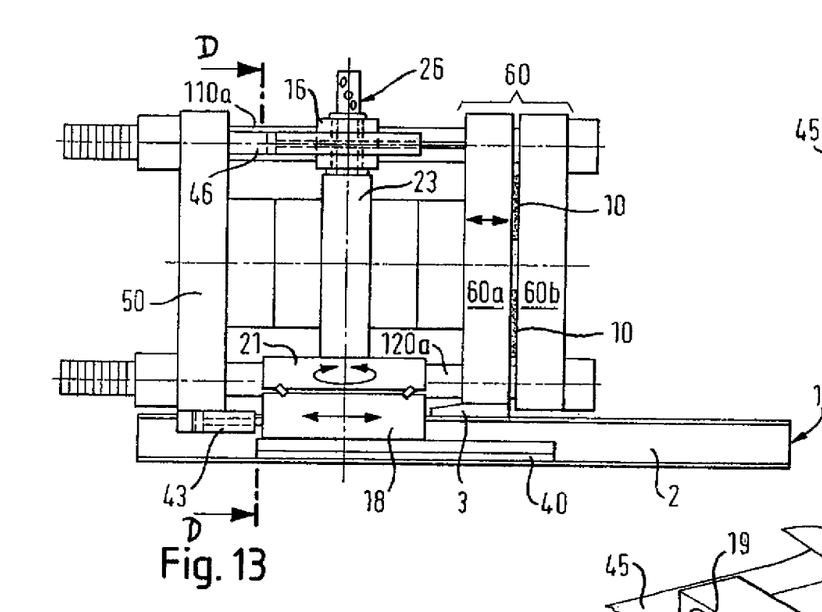
FIG. 13 shows schematically a side view of a fourth embodiment of a two-platen horizontal injection molding machine according to the invention.
Figure 14:
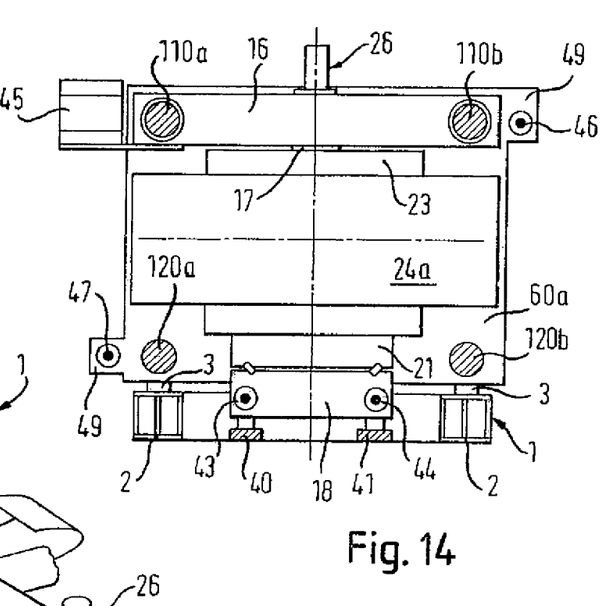
FIG. 14 shows schematically a front view of the two-platen horizontal injection molding machine of FIG. 13 taken along the line D-D.
Figure 15:
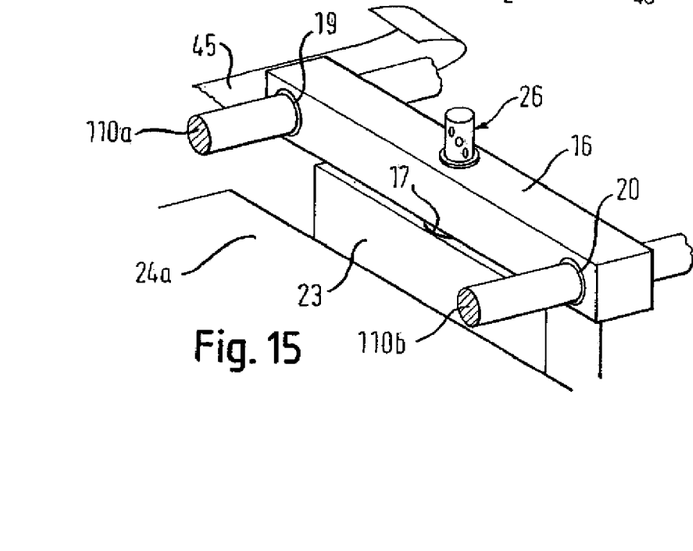
FIG. 15 shows a perspective top view with a detail of the yoke with an upper rotary distributor and a rotary feedthrough of the two-platen horizontal injection molding machine of FIG. 13.

FIGS. 13 to 15 illustrate a fourth embodiment of a two-platen horizontal injection molding machine according to the invention. In this embodiment, the rotary device is moved only by way of the actuators 43 and 44 operating on the base plate, while no actuators are installed between the yoke 16 and the fixed platen 50. Depending on the size of the machine, the linear guides 40 and 41 may here advantageously be provided with a dovetail cross-section and the like. Another difference to the previously described embodiments is that the travel of the moving platen 60 is attained by way of the two diagonally opposed hydraulic actuators 46 and 47, which are attached, on one hand, to the fixed platen 50 and, on the other hand, to the moving platen 60 by way of brackets 49. In all other aspects, the configuration and operation of this two-platen horizontal injection molding machine are identical to the third embodiment depicted in FIGS. 10 to 12.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A horizontal injection molding machine comprising:
two moving platens constructed for relative movement therebetween;
a base plate disposed between the two moving platens and constructed for movement in parallel relationship to a longitudinal machine axis;
a turntable supported on or in the base plate for rotation about a vertical axis;
a mold half carrier attached to the turntable for carrying mold halves of injection molding tools, said mold half carrier having a topside provided with a pivot pin;
a plurality of upper and lower columns extending between the fixed and moving platens; and
a yoke extending between the upper columns and movable relative to the upper columns, said yoke having an opening for rotatably accepting the pivot pin of the mold half carrier.

2. The horizontal injection molding machine of claim 1, wherein the pivot pin is supported on the topside of the mold half carrier for rotation therewith and constitutes an inner part of a rotary distributor configured to supply media to at least one of the mold half carrier and mold halves, said rotary distributor having a non-rotating outer part which is connected to the yoke.

3. The horizontal injection molding machine of claim 1, further comprising slide or roller bearings disposed between the yoke and the mold half carrier, with the mold half carrier supporting substantially the entire weight of the yoke.

4. The horizontal injection molding machine of claim 2, further comprising a second rotary distributor having a rotating inner part and a non-rotating outer part disposed below the mold half carrier, wherein the inner part passes through an opening in the base plate, protruding downwardly therefrom, and wherein the outer part is attached on a bottom side of the base plate.

5. The horizontal injection molding machine of claim 1, further comprising at least two actuators, with a first actuator arranged on a side of the yoke facing a first of the two platens and with a second actuator arranged on a side of the yoke facing a second of the two platens, and a centrally located actuator, or two or more off-center actuators disposed on both sides of the base plate, said centrally located actuator and the two or more off-center actuators arranged between the base plate and the two platens.

6. The horizontal injection molding machine of claim 1, wherein two actuators in diagonal opposition are provided on each of the two platens on a side of the platens facing away from the mold half carrier, with the actuators being supported, on one hand, on the respective platens and, on the other hand, on support struts connected to the machine bed.

7. A horizontal injection molding machine, comprising:
a fixed platen;
a moving platen constructed for movement in relation to the fixed platen;
a base plate disposed between the fixed and moving platens and constructed for movement in parallel relationship to a longitudinal machine axis;
a turntable supported on the base plate for rotation about a vertical axis;
a mold half carrier attached to the turntable for carrying mold halves of injection molding tools, said mold half carrier having a topside provided with a pivot pin;
a plurality of upper and lower columns extending between the fixed and moving platens;
a yoke extending between the upper columns and movable relative to the upper columns, said yoke having an opening for rotatably accepting the pivot pin of the mold half carrier.

8. The horizontal injection molding machine of claim 7, further comprising a first drive assembly moving the base plate and a second drive assembly arranged between the yoke and one of the fixed and moving platens, said second drive assembly having a first drive positioned on one side of the pivot pin and a second drive positioned on another side of the pivot pin for moving the yoke relative to the one of the fixed and moving platens.

9. The horizontal injection molding machine of claim 7, constructed in the form of a two-platen horizontal injection molding machine, wherein the one of the fixed and moving platens is the fixed platen, wherein the first and second drives are constructed as hydraulic actuators arranged to the left and right, respectively, of the pivot pin.

10. The horizontal injection molding machine of claim 7, wherein the yoke is supported upon the mold half carrier through intervention of a bearing unit.

11. The horizontal injection molding machine of claim 10, wherein the bearing unit is a slide bearing.

12. The horizontal injection molding machine of claim 10, wherein the bearing unit is a roller bearing.

13. The horizontal injection molding machine of claim 7, wherein the pivot pin is supported on the topside of the mold half carrier for rotation therewith and constitutes an inner part of a rotary distributor configured to supply media to at least one of the mold half carrier and mold halves, said rotary distributor having a non-rotating outer part which is connected to the yoke.

14. The horizontal injection molding machine of claim 7, further comprising a machine bed having first linear guides for guiding the movement of the moving platen, and second linear guides, provided on or in the machine bed, for guiding the movement of the base plate.

15. The horizontal injection molding machine of claim 8, wherein the first drive assembly is disposed between the base plate and the fixed platen.

16. The horizontal injection molding machine of claim 8, wherein the first drive assembly includes a hydraulic actuator.

17. The horizontal injection molding machine of claim 8, wherein the first drive assembly is disposed between the base plate and a retention member upon a machine bed.

18. The horizontal injection molding machine of claim 17, wherein the first drive assembly includes a hydraulic actuator.

19. The horizontal injection molding machine of claim 7, further comprising a trailing cable installation secured on the yoke for flexibly carrying along supply lines.

20. The horizontal injection molding machine of claim 7, further comprising a second rotary distributor having a rotating inner part and a non-rotating outer part disposed below the mold half carrier, wherein the inner part passes through an opening in the base plate, protruding downwardly therefrom, and wherein the outer part is attached on a bottom side of the base plate.

21. The horizontal injection molding machine of claim 7, further comprising two actuators arranged in diagonal opposition between the moving platen and the fixed platen for moving the moving platen, wherein the actuators are positioned external to the rotary device.

22. The horizontal injection molding machine of claim 7, further comprising two actuators arranged in diagonal opposition between a backside of the moving platen for moving the moving platen, and support struts connected to the machine bed.

23. The horizontal injection molding machine of claim 7, further comprising at least two actuators arranged between the yoke and the fixed platen on both sides of the pivot pin for moving the rotary device, and at least one additional centrally located actuator or two or more off-center actuators arranged on the base plate.

* * * * *